United States Patent [19]

Malzkorn

[11] Patent Number: 4,552,495

[45] Date of Patent: Nov. 12, 1985

[54] HORIZONTAL DRILLING AND MILLING MACHINE

[75] Inventor: Matthias Malzkorn, Jüchen, Fed. Rep. of Germany

[73] Assignee: Scharmann GmbH & Co., Mönchengladbach, Fed. Rep. of Germany

[21] Appl. No.: 641,489

[22] Filed: Aug. 16, 1984

[30] Foreign Application Priority Data

Aug. 19, 1983 [DE] Fed. Rep. of Germany ....... 3329964

[51] Int. Cl.⁴ ................................................ B23B 3/20
[52] U.S. Cl. ...................................... 409/136; 279/20; 408/57; 409/144; 409/230
[58] Field of Search ................ 409/136, 135, 144, 230; 408/56, 57, 58, 59, 60, 61, 124; 279/20; 29/26 A, 27 C; 184/14, 19

[56] References Cited

U.S. PATENT DOCUMENTS

| 3,589,237 | 6/1971 | Strohecker et al. | 409/144 X |
| 4,164,879 | 8/1979 | Martin | 409/136 X |
| 4,392,761 | 7/1983 | Eckle | 279/20 X |
| 4,396,317 | 8/1983 | Staron et al. | 279/20 X |
| 4,476,613 | 10/1984 | Wawrzyniak | 409/136 X |

FOREIGN PATENT DOCUMENTS

| 389913 | 11/1973 | U.S.S.R. | 408/56 |
| 595122 | 2/1978 | U.S.S.R. | 409/136 |
| 837762 | 6/1981 | U.S.S.R. | 409/136 |

Primary Examiner—Gil Weidenfeld
Assistant Examiner—Glenn L. Webb
Attorney, Agent, or Firm—Becker & Becker, Inc.

[57] ABSTRACT

A horizontal combined drilling and milling machine having a horizontally adjustable drilling and milling spindle, and a faceplate with a cross slide and tool cartridge. A precisely determinable supply of cooling medium to the tool is to be achieved in every position of the cross slide, and the exchange of the essential parts of the means for supplying the cooling medium to the cross slide should be effected without manual activity. For this purpose, the machine is provided with an adapter by means of which the cooling medium can be supplied via the drilling spindle and a flexible connection, such as a hose, to the radially adjustable cross slide, the cartridge, and the tool holder all the way to the shaft of the tool.

6 Claims, 4 Drawing Figures

HORIZONTAL DRILLING AND MILLING MACHINE

BACKGROUND OF THE INVENTION

The present invention relates to a horizontal combined drilling and milling machine having a horizontally adjustable drilling and milling spindle, and a faceplate with a cross slide and a tool cartridge.

Drilling and milling machines of this general type are known. Drilling apparatus are also known from other fields, and supply a cooling medium through a drilling rod to a tool. Thus, for example, German Auslegeschrift No. 28 20 165 discloses a drilling and milling machine having a horizontally adjustable drilling and milling spindle, according to which a cooling medium is supplied through the spindle and the tool connected thereto to the machining location at the workpiece. Furthermore, it is known from German Gebrauchsmuster No. 1 883 645 to conduct a cooling medium by means of a flexible hose from one part or portion of a machine tool to a second machine part which is movable relative to the first part.

In contrast to this state of the art, it is an object of the present invention to provide a horizontal drilling and milling machine of the aforementioned general type which assures a precisely definable supply of cooling medium to the tool in every position of the cross slide, even when the tool and tool holder extend into the workpiece. Existing cooling medium systems, with supply of a cooling medium through the hollow drilling spindle, can be utilized. The replacement and exchange of the essential parts, or the essential parts of the means for supplying the cooling medium to the cross slide of the faceplate, should be able to be effected without manual activity, and the means for supplying the cooling medium to the tool on the cross slide should be structurally simple and reliable in operation. To be taken into account in this connection is the fact that the tool holder, along with the tool, execute a threefold movement, namely a rotary motion about the central axis of the drilling spindle and the faceplate, secondly a back and forth movement in the longitudinal direction of the drilling spindle or the axial direction of the faceplate, and finally a radial movement which is brought about for the tool holder by the cross slide. To be furthermore taken into account as a fact that the tools of the drilling spindle and the cross slide cartridge should be capable of being automatically exchanged, for which purpose supply of cooling medium must be prevented or interrupted.

BRIEF DESCRIPTION OF THE DRAWINGS

These objects, and other objects and advantages of the present invention, will appear more clearly from the following specification in conjunction with the accompanying drawings, which show one exemplary inventive embodiment which illustrates those essential parts of the drilling and milling machine which are determinative of the present invention; in particular.

SUMMARY OF THE INVENTION

Figure 1:
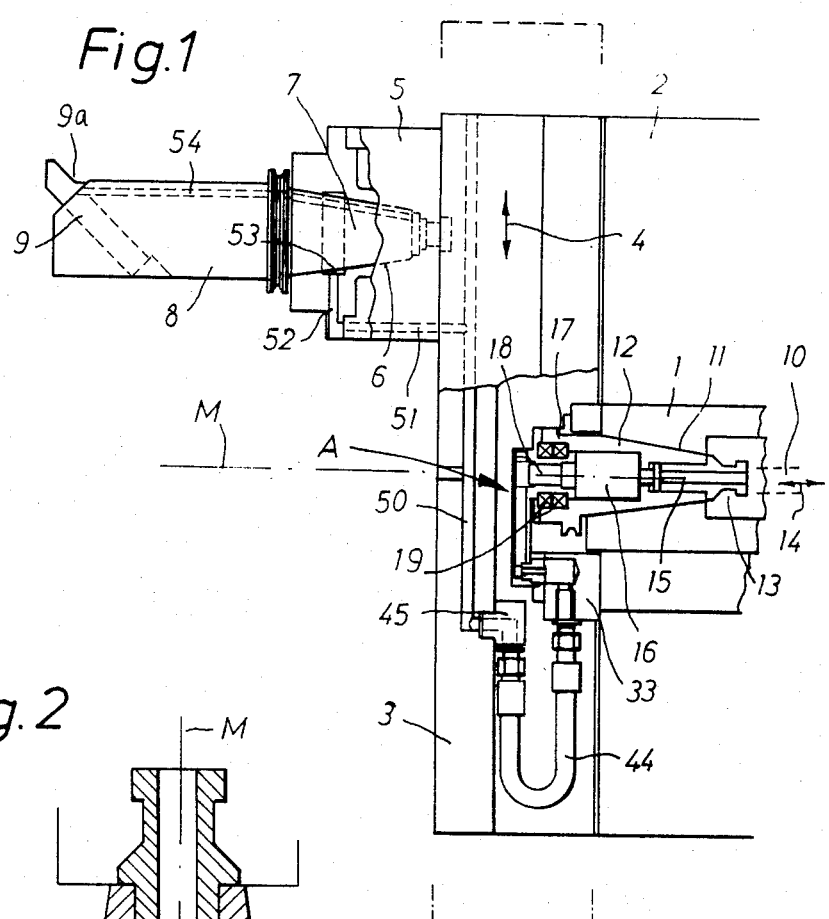
FIG. 1 shows the configuration and position of the faceplate of the cross slide, the tool cartridge disposed thereon, the tool holder with the tool, and the drilling spindle.

The drilling and milling machine of the present invention is characterized primarily by an adapter which comprises (a) a hollow cone-shaped head which can be removably inserted into the conical receiving bore of the hollow drilling spindle, which conveys a cooling medium, and (b) a hollow moving arm which is rotatable relative to the cone-shaped head and is connected therewith, and which has a portion or part which is removably connectable with a part or block disposed on the faceplate; a flexible connecting hose is disposed between the part or block of the faceplate and a cooling medium line in the cross slide.

Pursuant to further specific features of the present invention, the hollow cone-shaped head may be provided with (a) a ball bearing which compensates for the relative rotation between the drilling spindle and the moving arm which is removably connected with the faceplate; and (b) a sealing arrangement which seals off the bores of these two parts from one another. The part or block which is connected with the faceplate, and which receives one end of the moving or swivel arm and one end of the flexible hose, may accommodate a closure valve which opens when the appropriate end of the moving arm is connected, and closes when this arm end is removed.

The cross slide may support a block which receives one end of the flexible hose; the block may be provided with a check valve.

The cross slide and the tool cartridge may be provided with cooling medium lines or bores, and the cartridge may have an annular groove which encircles the conical end of the tool holder.

The adapter, from a tool magazine associated with the machine, and by means of a gripper device, may be adapted to be inserted at the proper angle into the drilling spindle, and to be removed therefrom and inserted back into the tool magazine.

The present invention overcomes the problem that between the drilling spindle and the faceplate there is on the one hand a relative rotational movement, i.e. a difference in rotational speed, and on the other hand the cross slide carries out a radial movement relative to the faceplate, whereby there must be insured that work can selectively be done with a tool on the drilling spindle or alternatively with a tool on the cross slide.

The advantage of the inventive machine is that, in addition to the realization of the stated objects, and the overcoming of the aforementioned problem, the adapter can be removed with simple means from the drilling spindle and the faceplate without manual activity, and can be placed in the proper position in a tool magazine or can be removed therefrom and inserted into the drilling spindle. For automating the operating sequences, a considerable simplification and saving of time is also provided for the supply of cooling medium to two different areas of use. Despite the different rotary movements of the drilling spindle and the faceplate, a reliable supplying of the cooling medium is assured without leakage from the drilling spindle to the tool holder on the cross slide or to the cartridge thereof.

DESCRIPTION OF PREFERRED EMBODIMENTS

Referring now to the drawings in detail, both the drilling spindle 1 and the faceplate 2 are disposed on the headstock, which can be moved upwardly or downwardly. The faceplate 2 carries the cross slide 3, which can be radially adjusted in the direction of the double arrow 4, and which supports the tool cartridge 5, into the conical recess 6 of which can be placed the similarily shaped shaft 7 of the tool holder 8, the front end of which supports the tool 9.

The drilling spindle 1 has a central longitudinal bore which is generally indicated with the reference numeral 10. Cooling medium is conveyed with the aid of a non-illustrated pump to the front end of the drilling spindle 1 through the longitudinal bore 10. When the pump is not running, no liquid coolant is conveyed to the front end of the spindle. The drilling spindle 1 has a conical recess 11, into which the tapered sleeve of the tool is placed when work is only being done with the drilling spindle, or which alternatively, as shown in FIG. 1, serves for receiving a conical and hollow cone-shaped head 12. At its back end, at 13, this cone-shaped head 12 has a configuration similar to that of the conical sleeve of the tool, namely an annular groove or other equivalent shape in order, with the aid of a non-illustrated drawing-in device to be able to pull the cone-shaped head 12 axially into the conical recess 11 in the direction of the arrow 14, and hence to be able to tightly secure the head 12 to the drilling spindle 1.

Figure 4:
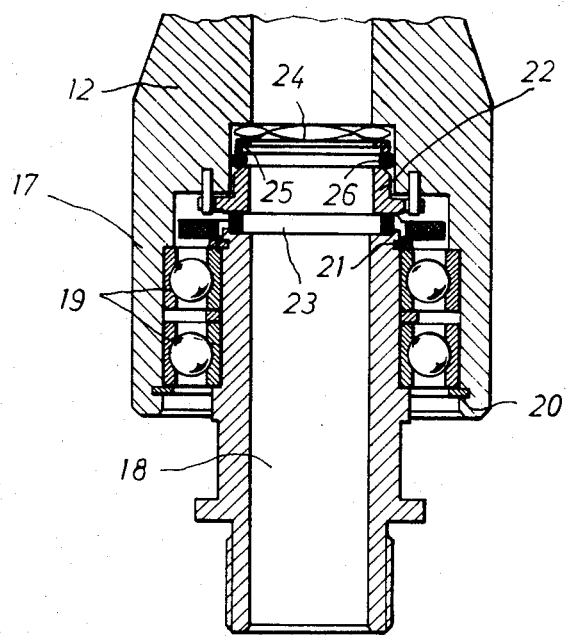
FIG. 4 shows a detail of the connection of the adapter with the front end of the drilling spindle, with this illustration being a modification of that shown in FIG. 1, yet equivalent thereto.

In line with the longitudinal bore 10 of the drilling spindle 1, the cone-shaped head 12 is provided with a bore 15 which passes into a widened portion 16. Since the drilling spindle 1 and the faceplate 2 have different speeds of rotation, an adapter A is provided between these two parts. The adapter A represents a self-contained part which can be transported in its entirety. The hollow cone-shaped head 12 forms that portion of the adapter which is to be connected to the drilling spindle 1, with this connection being effected in the aforementioned manner. The cone-shaped head 12 is provided with an annular collar 17, between the inside of which and a tubular piece 18 there is provided a double-row ball bearing 19. The ball bearing 19 is held in position relative to the collar 17 and the tubular piece 18 via the rings 20, 21 (FIG. 4). A gasket 23 is disposed between the end face of the tubular piece 18, and a floating slip ring 22 which is rigidly connected with the collar 17 of the cone-shaped head 12. With the aid of a spring 24, and a spacer 25 and seal 26, the gasket 23 seals off the space between the tubular piece 18 and the cone-shaped head 12 of the adapter A, despite the different speeds of rotation of these parts.

A hollow arm 27 is connected to the tubular piece 18 and is disposed at right angles thereto. On its free end, the arm 27 supports a connecting or transition piece 28. The arm 27, along with the cone-shaped head 12, forms the adapter A, and is pivotable about the central axis M of the drilling spindle 1. The adapter A serves for the supply of cooling medium from the drilling spindle 1 to a small receiving block 33, which is mounted on the face plate 2 (FIG. 2).

The thus described adapter A forms a structural unit which can be mechanically withdrawn from a tool magazine or storeroom; the cone-shaped head 12 of the adapter can be inserted in the drilling spindle 1, and the adapter can again be removed from the spindle and placed into the magazine. The parts of the adapter A maintain the respectively appropriate positions for connection to the faceplate 2 and the drilling spindle 1.

Figure 2:
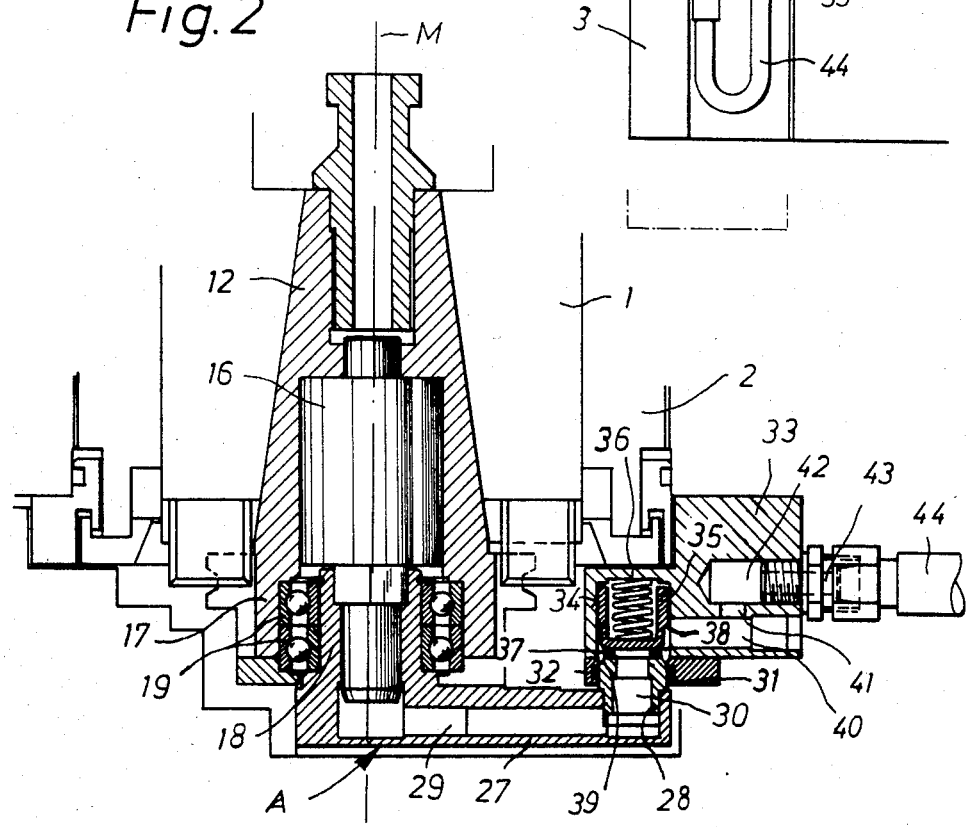
FIG. 2 shows the front end of the drilling spindle with the adapter.

As shown in FIG. 2, the tubular piece 18, the bore 29 in the arm 27, and the bore 30 in the connecting piece 28 are respectively disposed at right angles to one another, so that the bore 30 is parallel to the tubular piece 18.

The connecting piece 28 can be sealingly inserted into a bore 31 of a part 32 which is connected with the small receiving block 33; the connecting piece 28 is held in this position when the cone-shaped head 12 is secured in the drilling spindle 1. The bore 30 continues in a bore 34 of the block 33; this bore 34 accommodates a closure slide 35 which is under the effect of a spring 36 which urges the slide 35 against the connecting piece 28. The end face of the slide 35 is provided with cams 37 which are disposed in a circle and between which gaps exist; the cams 37 rests against the connecting piece 28 when the latter is introduced into the receiving bore 31 of the part 32. As shown toward the bottom and also toward the right in FIG. 2, when the parts 12, 27, and 28 of the adapter A are withdrawn from the drilling spindle 1, the spring 36 pushes the beveled sealing edge 38 of the slide 35 into sealing contact with the correspondingly shaped end edge of the part 32, so that the bore 34, which accommodates the slide 35, is sealed off toward the outside when, for example when the tool of the cross slide and the tool holder are removed, work is only done with the drilling spindle.

Figure 3:
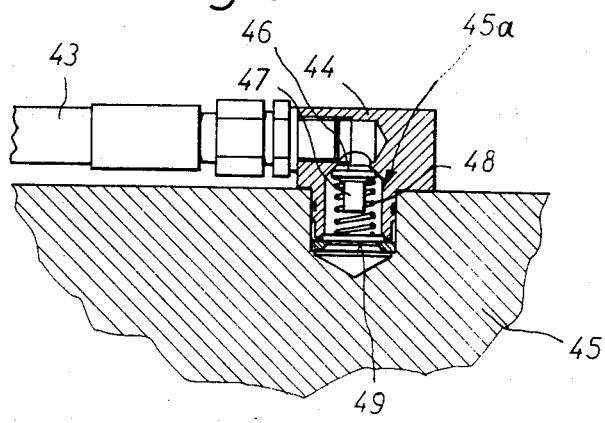
FIG. 3 shows an end of the flexible hose with the block which is disposed on the cross slide.

The bore 34 which accommodates the slide 35 communicates with a radial bore 40 of the block 33, so that when the slide is opened, cooling medium can pass via this radial bore 40 and intermediate bores 41, 42 to a threaded connector 43. The connector 43 is connected via a flexible hose 44 to a small block 45 which is mounted on the cross slide 3. As shown in FIG. 3, this block 45 is provided with a check valve 45a which comprises a valve disk 46, a valve stem 47, and a spring 48 which is arranged in such a way that the spring pressure closes the valve after the supply of cooling medium has been shut off during exchange of the tool 9 or the tool holder 8, because no cooling medium pressure is exerted on the appropriate end face of the valve disk 46, i.e. a pressure drop is observed in the line which is connected to the outlet side of the valve.

Associated with the block 45 of the cross slide 3 is a line 50 which is provided on or in the cross slide; from the line 50, a branch line 51 leads into and through the tool cartridge 5. A further line 52 is connected to the branch line 51 and ends in an annular groove or line 53. The tool holder 8, the end of which has the same configuration as does the cone-shaped head 12, is provided with a connection which opens or passes from the annular groove 53 to the longitudinal bore or line 54 in the tool holder 8; the line 54 extends to the front end of the tool holder 8 in the immediate vicinity of the tool head 9a, which projects out of the holder 8.

When exchange of the tool holder 8 is effected, the check valve 45a in the block 45 is closed as long as no tool holder is inserted into the cartridge 5. When a new tool with a tool holder is inserted into the cartridge 5, the check valve 45a opens when the supply of cooling medium is switched on, and cooling medium can then pass to the tool 9.

If work is only done with the drilling spindle, and with a tool inserted therein in place of the cone-shaped head 12, the slide 35 seals off the bore 34 which leads to the flexible hose 44 and thus prevents the hose 44 and the parts connected thereto from becoming dirty, or even clogged.

The part 32 and the block 33 could also be made as an integral piece.

The present invention is, of course, in no way restricted to the specific disclosure of the specification and drawings, but also encompasses any modifications within the scope of the appended claims.

What I claim is:

1. A horizontal combined drilling and milling machine, comprising:
    a hollow drilling spindle which conveys cooling medium and is provided with a conical receiving recess;
    a faceplate having a first part disposed thereon;
    a cross slide movably supported on said faceplate;
    a tool cartridge supported on said cross slide for receiving a tool holder which is adapted to hold a tool;
    an adapter, which includes a hollow cone-shaped head which can be removably inserted in said conical receiving recess of said drilling spindle to receive cooling medium therefrom; said adapter also includes a hollow moving arm which is connected to said cone-shaped head, is rotatable relative thereto, and can receive cooling medium therefrom; said arm includes a second part which can be removably connected to said first part of said faceplate and can convey cooling medium thereto;
    a cooling medium line associated with said cross slide; and
    a flexible connection disposed between said first part of said faceplate and said cooling medium line to convey cooling medium from the former to the latter.

2. A machine according to claim 1, in which said hollow cone-shaped head includes a ball bearing arrangement which compensates for relative movement between said drilling spindle and said moving arm when said cone-shaped head is inserted in said conical receiving recess of said drilling spindle; in which said cone-shaped head and said arm are provided with bores for receiving cooling medium; and in which said cone-shaped head further includes sealing means for sealing said last-mentioned bores relative to one another.

3. A machine according to claim 2, in which said first part of said faceplate is provided with a closure valve which is disposed in the line of communication for cooling medium from said second part of said arm to said flexible connection in such a way that when said second part of said arm is connected to said first part of said faceplate, said closure valve opens to establish said communication, and when said second part of said arm is disconnected from said first part, said closure valve closes off said communication.

4. A machine according to claim 3, in which said cross slide supports a small block which, for receiving cooling medium from said flexible connection and conveying it to said cooling medium line, communicates with a portion of said flexible connection remote from said first part of said faceplate; and in which said block is provided with a check valve which is disposed in the line of communication for cooling medium from said flexible connection to said cooling medium line.

5. A machine according to claim 3, in which said cross slide and said tool cartridge are provided with further cooling medium lines which communicate with said previously mentioned cooling medium line of said cross slide; in which said tool holder has a conical end; and in which said tool cartridge has an annular groove which communicates with said further cooling medium lines and encircles said conical end of said tool holder.

6. A machine according to claim 3, in which said adapter is capable of being removed from a tool magazine associated with said machine by means of a gripper device, is adapted to be inserted at the proper angle into said drilling spindle by means of said gripper device, and is adapted to be removed by the latter from said drilling spindle and placed back into said tool magazine.

* * * * *